United States Patent [19]

Athayde et al.

[11] Patent Number: 5,082,471
[45] Date of Patent: Jan. 21, 1992

[54] LIFE SUPPORT SYSTEM FOR PERSONNEL SHELTER

[75] Inventors: Amulya L. Athayde, Mountain View; Johannes G. Wijmans, Menlo Park; Richard W. Baker, Palo Alto, all of Calif.

[73] Assignee: Membrane Technology & Research, Inc., Menlo Park, Calif.

[21] Appl. No.: 597,714

[22] Filed: Oct. 15, 1990

[51] Int. Cl.$^5$ .................. B01D 53/04; B01D 53/22
[52] U.S. Cl. .......................... 55/16; 55/68; 55/74; 55/158; 55/387
[58] Field of Search ............. 55/16, 68, 74, 158, 55/316, 387

[56] References Cited

U.S. PATENT DOCUMENTS

| | | | |
|---|---|---|---|
| 3,355,861 | 12/1967 | Webb | 55/158 |
| 3,369,343 | 2/1968 | Robb | 55/16 |
| 3,510,387 | 5/1970 | Robb | 55/16 X |
| 3,930,813 | 1/1976 | Gessner | 55/16 |
| 3,930,814 | 1/1976 | Gessner | 55/16 |
| 4,174,955 | 11/1979 | Blackmer et al. | 55/16 X |
| 4,198,213 | 4/1980 | Mannatt | 55/16 |
| 4,214,020 | 7/1980 | Ward et al. | 55/16 X |
| 4,230,463 | 10/1980 | Henis et al. | 55/68 X |
| 4,243,701 | 1/1981 | Riley et al. | 55/158 X |
| 4,553,983 | 11/1985 | Baker | 55/158 X |
| 4,673,418 | 6/1987 | Peinemann | 55/16 X |
| 4,681,602 | 7/1987 | Glenn et al. | 55/16 X |
| 4,701,187 | 10/1987 | Choe et al. | 55/26 X |
| 4,732,579 | 3/1988 | Veltman et al. | 55/26 X |
| 4,793,832 | 12/1988 | Veltman et al. | 55/26 X |
| 4,818,452 | 4/1989 | Kneifel et al. | 55/158 X |
| 4,840,646 | 6/1989 | Anand et al. | 55/158 X |
| 4,857,078 | 8/1989 | Watler | 55/16 |
| 4,857,080 | 8/1989 | Baker et al. | 55/16 |
| 4,863,492 | 9/1989 | Doshi et al. | 55/25 X |
| 4,871,378 | 10/1989 | Pinnau | 55/16 |
| 4,881,953 | 11/1989 | Prasad et al. | 55/16 |
| 4,906,256 | 3/1990 | Baker et al. | 55/16 |
| 4,963,165 | 10/1990 | Blume et al. | 55/158 X |
| 4,990,255 | 2/1991 | Blume et al. | 55/158 X |

*Primary Examiner*—Robert Spitzer
*Attorney, Agent, or Firm*—J. Farrant

[57] ABSTRACT

A life-support system including a shelter, combined with equipment for sustaining a breathable atmosphere within the shelter. The breathable atmosphere is sustained by providing a supply of fresh air to the shelter, and removing carbon dioxide from the shelter. To provide the air supply, air containing a toxic agent is fed to a membrane separation unit. The membrane unit has a high selectivity to the permeation of oxygen over toxic agent and produces an oxygen-enriched permeate stream, while rejecting almost all of the toxic agent. The oxygen-enriched air is then passed through a unit containing a sorbent, such as activated carbon, to remove any remaining traces of toxic material before being fed to the shelter. The carbon dioxide content of the shelter air is kept below 1% either by sweeping the carbon dioxide away by maintaining a relatively high flow of air into and out of the shelter, or by withdrawing air from the shelter, treating it in a separate unit of equipment to remove carbon dioxide, and then returning the treated air to the shelter.

19 Claims, 6 Drawing Sheets

LIFE SUPPORT SYSTEM FOR PERSONNEL SHELTER

This invention was made with Government support under Contract Number DAAA15-88-C-0025, awarded by the U.S. Department of Defence. The Government has certain rights in this invention.

FIELD OF THE INVENTION

The invention relates to personnel shelters for use in hazardous or toxic chemical environments. More particularly, the invention relates to maintenance of a detoxified air supply to such shelters, and the maintenance of a breathable atmosphere within such shelters.

BACKGROUND OF THE INVENTION

In a hazardous or toxic chemical environment, such as may be found during chemical warfare, or in other situations where toxic chemicals are used, personnel may be exposed to various organic chemical vapors. Shelters equipped with detoxified air supply systems have been developed for use in military or other settings. Personnel shelters for use again nuclear, biological or chemical warfare agents typically employ carbon filters, such as ASC Whetlerite filters, to sorb toxic agents from the air flowing into the shelter. Filter cartridges have a limited life and must be replaced when the filtration capacity has been expended. Replacement is expensive and forms a significant logistic burden.

Membrane systems that can separate organic vapors from air are known. For example, U.S. Pat. No. 4,553,983 describes a method of removing and recovering organic vapors from air, using a rubbery membrane. Rubbery membranes are typically 50 to 100 times more permeable to large organic molecules than to oxygen and nitrogen, so the organic agent will be concentrated in the permeate stream, leaving a residue stream containing oxygen and nitrogen. However, the oxygen content of the residue air will be lower than that of the feed air, because rubbery membranes are normally slightly more permeable to oxygen than to nitrogen.

SUMMARY OF THE INVENTION

The invention is a life-support system for use under conditions of exposure to hazardous or toxic chemical gases, vapors or aerosols, such as chemical warfare, or in other situations where personnel must be protected from a hostile environment. The system provides a shelter, combined with equipment for sustaining a breathable atmosphere within the shelter. The breathable atmosphere is sustained by providing a supply of fresh air to the shelter, and removing carbon dioxide from the shelter. To provide the air supply, air containing a toxic or hazardous chemical agent is fed to a membrane separation unit. The membrane unit has a high selectivity to the permeation of oxygen over chemical agent and produces an oxygen-enriched permeate stream, while rejecting almost all of the chemical agent. The oxgen-enriched air is then passed through a unit containing a sorbent, such as activated carbon, to remove any remaining traces of toxic material before being fed to the shelter.

The carbon dioxide content of the shelter air is kept below 1% either by sweeping the carbon dioxide away by maintaining a relatively high flow of air into and out of the shelter, or by withdrawing air from the shelter, treating it in a separate unit of equipment to remove carbon dioxide, and then returning the treated air to the shelter.

In another aspect, the invention is a process for maintaining a detoxified, breathable atmosphere within a personnel shelter, by passing air containing a chemical agent through a membrane unit and sorbent unit as described above, and by removing carbon dioxide.

In another aspect, the invention provides a method for prolonging the life of a carbon filter or other sorbent unit by pretreating the feed stream to the filter by passing it through a membrane unit containing a membrane preferentially permeable to oxygen and nitrogen over chemical agents.

The life-support systems and processes of the invention have several advantages over conventional systems and processes. First, the air fed to the sorbent unit contains greatly reduced levels of the toxic agent. Therefore, the amount of agent that must be removed by the carbon filter is reduced and the filter life is greatly extended. In some cases, the need for filter replacement is eliminated.

A second advantage is that the air from the membrane unit is oxygen-enriched. Consequently, a lesser total flow of air to the shelter is required to maintain a normal level of oxygen in the shelter air. Thus the load on the sorbent unit, pumps and other components of the air supply system, per person housed within the shelter, is reduced.

A third advantage is that the membrane unit is not agent specific. Since separation occurs on the basis of relative diffusion coefficients, all large organic molecules are rejected. This is advantageous in the field of chemical defense, where the rate of development of new toxins outstrips the growth of protective technology. A membrane detoxification unit is useful against a wide spectrum of agents, including agents that are yet to be developed.

It is an object of the invention to provide a life-support shelter for use in situations where the ambient air is contaminated with a toxic or hazardous organic chemical.

It is an object of the invention to sustain a breathable atmosphere within a life-support shelter.

It is an object of the invention to provide a supply of breathable air to a life-support shelter.

It is an object of the invention to remove carbon dioxide from a life-support shelter.

It is an object of the invention to prolong the life of an air filter used in treating the air supply to a life-support shelter.

It is an object of the invention to reduce the load on an air filter used to detoxify the air supply to a life-support shelter.

Other objects and advantages of the invention will be apparent from the description of the invention to those of ordinary skill in the art.

DETAILED DESCRIPTION OF THE INVENTION

Figure 1:
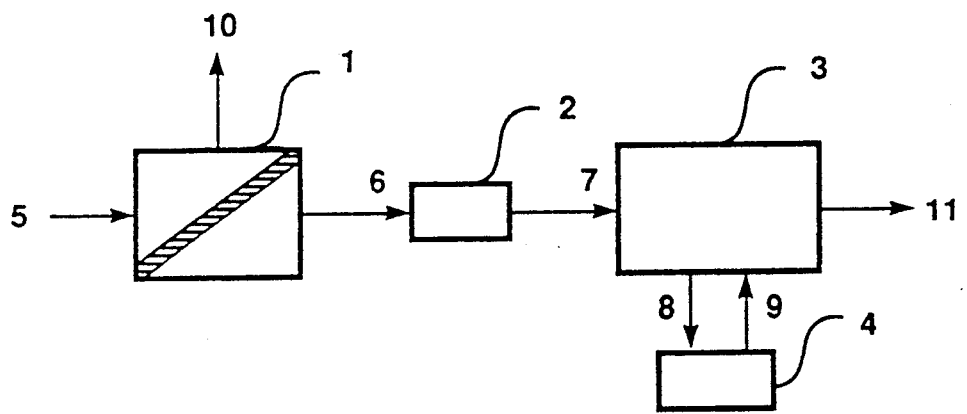
FIG. 1 is a schematic drawing of a life-support system including a personnel shelter, a membrane unit, a sorbent unit and a carbon dioxide removal unit.

A basic embodiment of the life support system of the invention is shown in FIG. 1. Referring now to this figure, the system has four elements, a membrane unit, 1, a sorbent unit, 2, a shelter, 3, and a carbon dioxide removal unit, 4. The sorbent unit, membrane unit and shelter are connected in series, so that the treated air stream from the membrane unit passes through the sorbent unit and thence to the shelter. The carbon dioxide removal unit is a separate unit, connected to the shelter so that air containing carbon dioxide can be withdrawn from the shelter and air from which some or all of the carbon dioxide has been removed can be returned to the shelter.

The membrane unit contains a permselective membrane, which forms a barrier that is relatively permeable to oxygen and nitrogen, but relatively impermeable to chemical agents. The selectivity of a polymer to oxygen ($O_2$) relative to chemical agent (A) can be expressed in terms of an ideal separation factor, $\alpha_{(O2/A)}$, defined by the relationship, $$\alpha_{(O2/A)} \equiv \frac{P_{(O2)}}{P_{(A)}}, \quad (1)$$

where $P_{(O2)}$ is the permeability of the membrane to oxygen and $P_{(A)}$ is the permeability of the membrane to the chemical agent. Equation 1 can also be written as $$\alpha_{(O2/A)} \equiv \left(\frac{D_{(O2)}}{D_{(A)}}\right)\left(\frac{S_{(O2)}}{S_{(A)}}\right). \quad (2)$$

The ratio $D_{(O2)}/D_{(A)}$ is the ratio of the diffusion coefficients of oxygen and the chemical agent and can be viewed as the "mobility selectivity," reflecting the different sizes of the two molecules. The ratio $S_{(O2)}/S_{(A)}$ is the ratio of the Henry's law solubility coefficients of the components and can be viewed as the "solubility selectivity," reflecting the relative condensabilities. The mobility selectivity, $D_{(O2)}/D_{(A)}$, will always be larger than one (with glassy polymers, much larger than one), reflecting the larger size of chemical agents compared to oxygen. However, the solubility selectivity will normally be less than one (with rubbery polymers, much less than one), reflecting the greater condensability of chemical agents compared to oxygen.

To obtain a high intrinsic selectivity, $\alpha_{(O2/A)}$, it is desirable to maximize the mobility selectivity while reducing the effect on the overall selectivity of the solubility term. This can be done by using glassy polymers having limited segmental chain mobility. In polystyrene, for example, organic molecules with a molecular weight of around 100 have diffusion coefficients of the order of $1 \times 10^{-13}$ $cm^2 sec^{-1}$, and oxygen has a diffusion coefficient of $1 \times 10^{-7}$ $cm^2 sec^{-1}$. Thus, the mobility selectivity of polystyrene for oxygen over even smallish organic molecules is of the order of $10^6$. This mobility selectivity will be offset by the solubility selectivity because of the much greater condensability of the organic vapor. Nonetheless, an overall selectivity of up to 1,000 or more for the larger agents, such as GB, VX, and mustard, may be achievable. For use in the invention, membranes should exhibit an oxygen/organic agent selectivity of at least 5, preferably at least 10, more preferably at least 20, and most preferably at least 100.

The membrane used in the system may take the form of a homogeneous membrane, a membrane incorporating a gel or liquid layer, or any other form known in the art. To achieve a high flux of the permeating components, the permselective membrane should be made as thin as possible. Preferred embodiments of the invention use an asymmetric polymer membrane, consisting of a relatively open, porous substrate with a thin, dense, permselective skin layer. Such membranes are known in the gas-separation art, and may be prepared, for example, by various modifications of the Loeb-Sourirajan process. This process involves preparing a solution of the polymer in a suitable solvent, casting a thin film and then immersing the film in a precipitation bath. The resulting membrane has an asymmetric structure graded from openly microporous on the support surface to non-porous or very finely microporous on the skin side. Such gas-separation membranes are frequently over-coated with a sealing layer on the skin side, to prevent bulk flow of gases through pores or other defects. The preparation and properties of asymmetric gas-separation membranes are described, for example, in U.S. Pat. No. 4,230,463 to Henis and Tripodi, or U.S. Pat. No. 4,840,646 to Dow Chemical. Suitable polymers for making asymmetric membranes include polysulfones, including polyethersulfones, polyimides, including polyetherimides, polyamides, polycarbonates, ethylcellulose and other cellulose derivatives, polyphenylene oxide, polymethylpentene, polyacetylenes and substituted polyacetylenes.

The membrane may also take the form of a composite membrane, comprising a microporous support, onto which a permselective layer is deposited as an ultrathin coating, for example by dip coating. The dip-coating method is described, for example, in U.S. Pat. No. 4,243,701 to Riley et al. In a typical dip-coating process, the support membrane from a feed roll is passed through a coating station, then to a drying oven, and is then wound onto a product roll. The coating station may be a tank containing a dilute polymer or prepolymer solution, in which a coating typically 50 to 100 microns thick is deposited on the support. Assuming a 1% concentration of polymer in the solution, after evaporation a film 0.5 to 1 micron thick is left on the support.

To obtain a high flux, the thickness of the permselective layer should preferably be less than 20 microns, more preferably 5 microns or less, and most preferably 2 microns or less. The oxygen flux of the membrane should preferably be at least $1 \times 10^{-6}$ $cm^3$(STP)/$cm^2$.s.cmHg, and more preferably at least $1\times10^{-5}$ $cm^3$(STP)/$cm^2$.s.cmHg.

The form in which the membranes are used in the invention is not critical. They may be used, for example, as flat sheets or discs, coated hollow fibers, or spiral-wound modules, all forms that are known in the art. Spiral-wound modules are a preferred choice. References that teach the preparation of spiral-wound modules are S.S. Kremen, "Technology and Engineering of ROGA Spiral Wound Reverse Osmosis Membrane Modules", in *Reverse Osmosis and Synthetic Membranes*, S.Sourirajan (Ed.), National Research Council of Canada, Ottawa, 1977; and U.S. Pat. No. 4,553,983, column 10, lines 40–60. Alternatively the membranes may be configured as microporous hollow fibers coated with the permselective polymer material and then potted into a module.

The membrane unit may contain one or more membrane modules, arranged in many possible ways. The simplest arrangement is a single-stage unit, in which the incoming air passes through a bank of one or more modules, a fraction of the feed passing through each module. If a greater degree of organic agent removal or oxygen enrichment is needed, the permeate stream may be passed to a second bank of modules for further treatment. The residue stream could also be further treated if necessary.

Figure 2:
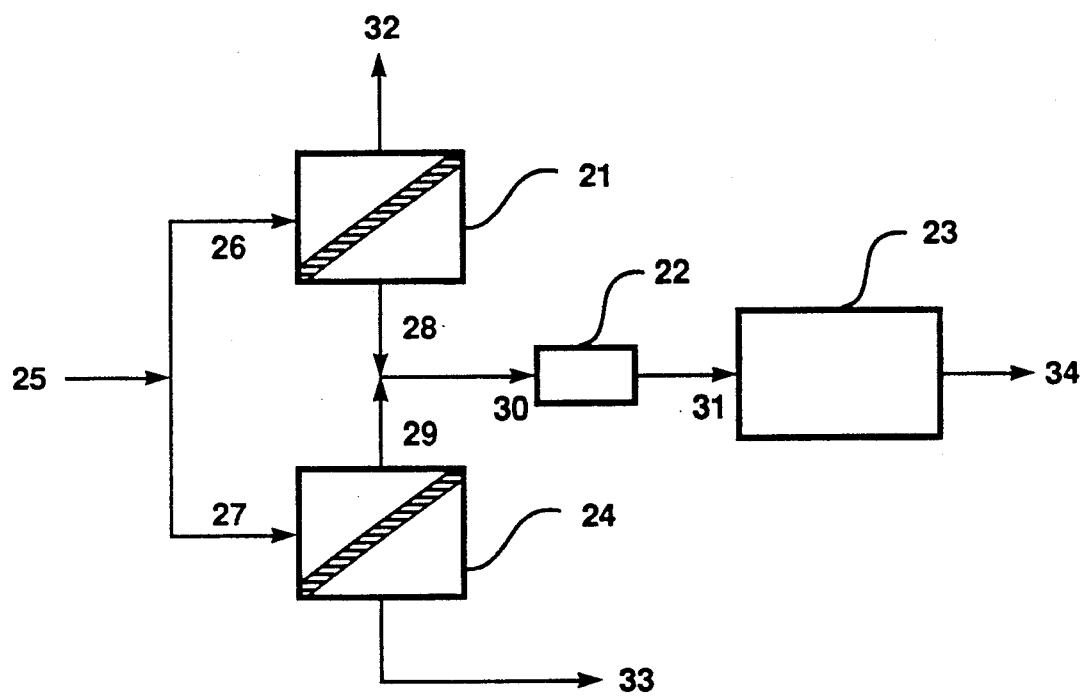
FIG. 2 is a schematic drawing of a life-support system including a personnel shelter, a first membrane unit for detoxifying air and enriching the oxygen content, a second membrane unit for providing a nitrogen sweep gas and a sorbent unit.

Since no membrane has infinite selectivity, some trace quantities of organic agent will always remain in the treated air stream emerging from the membrane unit. Depending on the agent concerned, it may or may not be necessary to pass the treated air through an additional treatment to reduce the organic agent content to a lower level. However, simply as an additional safety precaution, it is preferable to incorporate a second toxic agent removal unit between the membrane unit and the shelter. The second removal unit will normally contain a material that sorbs the toxic agent molecules. The sorbent can be liquid or solid. It may bind the toxic agent physically, or may be chemically reactive with the toxic agent to neutralize it. Typical sorbents that may be used include ion-exchange resins, molecular sieve materials and activated carbon. A preferred sorbent unit is a carbon filter, such as an ASC Whetlerite filter. In the context of the invention, the terms "sorbent unit" and "filter" mean any unit that contains a substance that will sorb or otherwise trap chemical agents.

The carbon dioxide removal unit is used to maintain the carbon dioxide content of the shelter air at a low level. A stream of air is withdrawn from the shelter, treated to reduce the carbon dioxide concentration, and then returned to the shelter. Many technologies are known for removing carbon dioxide from gas streams. The carbon dioxide removal unit may incorporate any of these. For example, the unit may be a scrubber containing a liquid amine-type sorbent; it may contain a sorbent such as lithium hydroxide; it may be a pressure swing adsorption unit containing a molecular sieve. The carbon dioxide removal unit could also be a membrane unit, containing membranes that are selectively permeable to carbon dioxide over oxygen and nitrogen. Membranes suitable for removing carbon dioxide from air include those made from rubbery polymers, such as nitrile rubber, neoprene, polydimethylsiloxane (silicone rubber), chlorosulfonated polyethylene, polysilicone-carbonate copolymers, fluoroelastomers, plasticized polyvinylchloride, polyurethane, cis-polybutadiene, cis-polyisoprene, poly(butene-1), polystyrene-butadiene copolymers, styrene/butadiene/styrene block copolymers, styrene/ethylene/butylene block copolymers and thermoplastic polyolefin elastomers. Cellulose acetate membranes and membrane made from other cellulose derivatives are also useful in the separation of carbon dioxide. Particularly useful membrane materials are block copolymers of polyethers and polyamides, having the general formula:

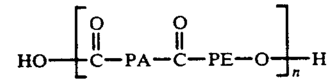

wherein PA is a saturated aliphatic polyamide segment, PE is a polyether segment, and n is a positive integer. The membranes used in the carbon dioxide removal unit could be used in any of the forms described above for the membrane detoxification unit. If a rubbery polymer or copolymer is used for the permselective membrane, the preferred membrane configuration is a composite membrane, in which the thin permselective layer is coated onto a microporous support.

A particularly preferred carbon dioxide removal unit is an electrochemical unit. Such units have already been used in submarines and spacecraft, and have the advantage of being comparatively small and light compared with other types of scrubbers. In such a unit, carbon dioxide is selectively transported across an electrochemical cell or fuel cell containing an appropriate electrolyte, such as molten carbonate.

When the system of FIG. 1 is in use, an air stream, 5, containing a chemical agent enters membrane unit, 1. The air stream flows over the membrane, which is selective for oxygen and nitrogen over the organic vapor. Thus the permeate stream, 6, from the membrane unit contains oxygen and nitrogen, with only traces of organic vapor. Most membranes permeate oxygen faster than nitrogen, so the permeate stream will usually be enriched in oxygen compared to normal air. In the context of the invention, the term "oxygen-enriched" means containing more than 20% oxygen. The oxygen content of the permeate stream, 6, will typically be greater than 20% oxygen and may be much higher, such as 35% oxygen, 50% oxygen or 60% oxygen. The residue stream, 10, will be concentrated in organic vapor compared with the feed air, and is normally rejected to the environment. The permeate stream, 6, from the membrane unit passes through sorbent unit, 2, which contains a sorbent that removes any remaining organic agent from the air stream. Stream, 7, leaving the sorbent unit is thus oxygen-enriched air from which the chemical agent has been removed. This stream passes to the shelter, 3, and provides the air supply to the shelter. A stream of air, 8, from the shelter is withdrawn and passed to carbon dioxide removal unit, 4. Air from which some or all of the carbon dioxide has been removed is then returned to the shelter as stream, 9. The flow of air that must be passed through the carbon dioxide removal unit will depend on the volume of the shelter and the number of occupants. A preferred target for the carbon dioxide removal unit is to maintain the concentration of carbon dioxide within the shelter air at 1% or below. This concentration is generally recognized as the 24-hour exposure limit of humans to carbon dioxide. The flow of air into the shelter through stream, 7, is balanced by exhaust stream, 11.

An alternative life-support system is shown in FIG. 2. In this system, the approach to maintaining the carbon dioxide concentration within the shelter to below the threshold value is different from that in FIG. 1. In the system of FIG. 2, relatively high feed and exhaust flow rates into and out of the shelter are used. As exhaust stream, 34, flows out of the shelter, it sweeps away the carbon dioxide produced by respiration, diluting the concentration in the shelter to atmospheric levels. This technique requires no separate carbon dioxide removal unit. Referring now to FIG. 2, the system again has four elements: a first membrane unit, 21, a sorbent unit, 22, a shelter, 23, and a second membrane unit, 24. Feed air to the system may enter as a single stream, 25, which is then split into two streams, 26 and 27, or two separate air intakes may be used. The sorbent unit, first membrane unit and shelter are as described in connection with FIG. 1. Residue stream 32 is rejected to the environment. The second membrane unit, 24, is used to generate a nitrogen-enriched sweep stream. In the context of the invention, the term "nitrogen-enriched" means containing more than 80% nitrogen. This membrane unit contains a permselective membrane made from a rubbery polymer, such as silicone rubber or one of the rubbery polymers mentioned above as suitable for use in a membrane-based carbon dioxide removal unit. The second membrane unit treats the contaminated air stream, 27, by removing most of the toxic agent, as well as some of the oxygen, through the membrane as stream 33. The nitrogen-enriched residue stream, 29, is combined with the oxygen-enriched stream, 28, from the first membrane unit, 21, to produce an air supply stream, 30, which then passes as before through sorbent unit, 22, and thence as stream, 31 to shelter, 23. In this embodiment, the oxygen-enriched air from the first membrane unit is diluted by stream 29. Thus the oxygen concentration in the air supply to the shelter is typically at or close to the normal oxygen concentration of air, such as about 21% oxygen. In this embodiment, therefore, the volume of air passing through the sorbent unit, 22, is about the same as it would be in a conventional filtration system. Therefore, the life extension of the sorbent is solely that which is due to the removal of toxic agent by the membranes. If the membrane system reduces the agent concentration tenfold, for example, this results in a filter life extension of ten times.

An advantage of this system design is that the oxygen content of the air supply to the shelter may be controlled. Depending on the type of membrane used in the first membrane unit, and the operating parameters, the stream from this unit may contain very high concentrations of oxygen, such as 50% or 60% oxygen. Concentrations this high may present a fire and explosion hazard. Consequently dilution to a lower oxygen level may be advantageous. The relative volumes of streams 28 and 29 may be adjusted to supply an air stream with any desired oxygen concentration. The sweep unit also provides an excess flow to the shelter which can be used to maintain a positive flow out of the shelter as well as to decontaminate personnel entering the shelter and purge the airlock.

Figure 3:
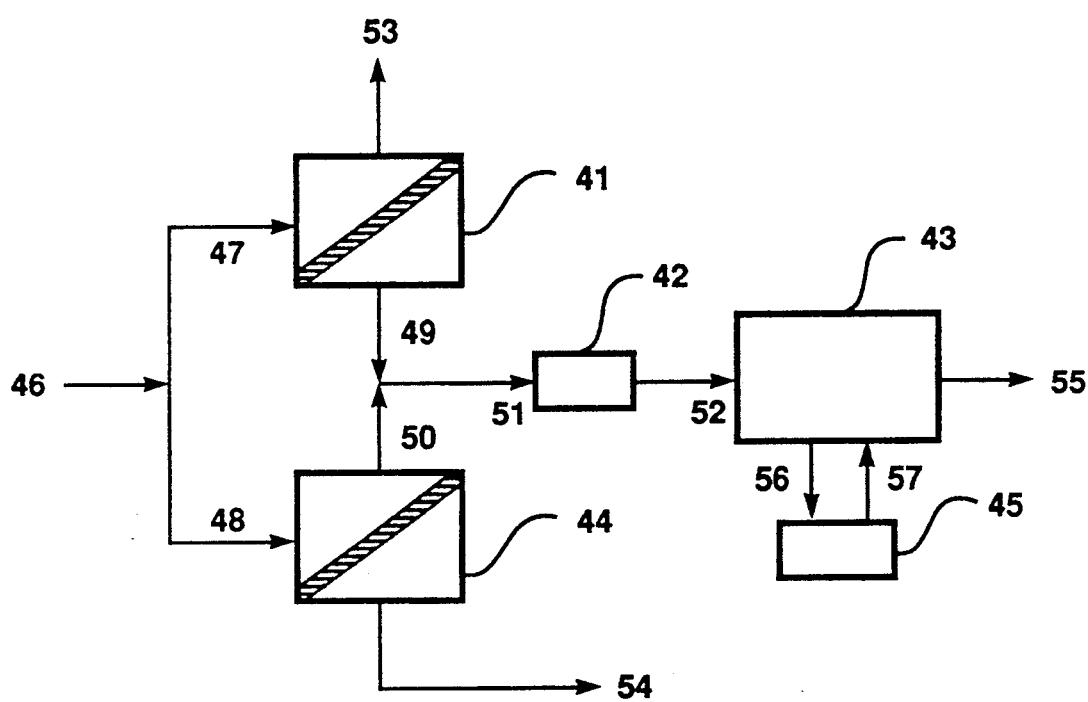
FIG. 3 is a schematic drawing of a life-support system including a personnel shelter, a first membrane unit for detoxifying air and enriching the oxygen content, a second membrane unit for providing a nitrogen sweep gas, a sorbent unit and a carbon dioxide removal unit.

A third life-support system is shown in FIG. 3. Referring now to this figure, it may be seen that it combines the sweep concept of FIG. 2 with the separate carbon dioxide removal unit of FIG. 1. In this case, the flow rate of the sweep stream can be relatively small, since it is not relied on alone for carbon dioxide removal. The sweep still provides the advantages of permitting the oxygen content of the air supply to be diluted to a chosen value, and can be used for decontamination and purging. In the system of FIG. 3, incoming contaminated air stream, 46, is divided into streams 47 and 48, which pass to membrane units, 41 and 44. Membrane unit, 41, makes oxygen-enriched air, 49, and produces residue stream, 53, which is rejected to the environment. Membrane unit, 44, treats the contaminated air stream, 48, by removing most of the toxic agent, as well as some of the oxygen, through the membrane as stream 54. The nitrogen-enriched stream, 50, is combined with the oxygen-enriched stream, 49, from the first membrane unit, 41, to produce an air supply stream, 51, which then passes as before through sorbent unit, 42, and thence as stream, 52 to shelter, 43. In this embodiment, the carbon dioxide content of the shelter air is reduced by withdrawing stream, 56 from the shelter, passing it through the carbon dioxide removal unit, 45, and returning the treated stream, 57, to the shelter. Flow through the shelter is maintained by exhaust stream, 55.

The above system designs are intended to be representative, but non-limiting. Other system configurations are possible. For example, a fourth configuration may be used in which the membrane unit, 1, is replaced by a membrane unit of the same type as the second membrane unit, 24, of FIG. 2. The membrane unit then preferentially permeates oxygen and toxic agent, leaving a residue stream of nitrogen-enriched, toxic agent depleted air on the feed side of the membrane. In this case, the air supply to the personnel shelter will be slightly oxygen-depleted compared to regular air. Such a system might be useful, however, if no carbon dioxide removal unit were to be used. A fifth possible configuration would be a system of the same type as the fourth configuration, used in conjunction with a separate carbon dioxide removal unit.

A particular advantage of the systems and processes of the invention is in extending the life of the sorbent unit. The life is extended in two ways. First the amount of organic agent in the air stream being fed to the sorbent unit is reduced many-fold. Typically the membrane units used in the invention will be able to reduce the toxic agent content of the air stream by at least 80%, and more generally by 90% or more, such as 95% or 99%. If the toxic agent content of the stream being fed to the sorbent unit is only 5% of its original value, then 20 volumes of air must pass through the sorbent unit before the same quantity of toxic agent has been sorbed, so the lifetime of the sorbent will be increased 20-fold. Likewise, if the toxic agent content is reduced to 10% of its original value, the lifetime of the sorbent will be increased 10-fold, and if the toxic agent content is reduced to 1% of its original value, the lifetime of the sorbent will be increased 100-fold.

The second way in which the lifetime is extended is by reducing the overall load on the sorbent unit and ancillary components of the system, such as pumps. The membrane unit produces a stream of oxygen-enriched air, with an oxygen content that may be 30%, 40%, 50% or more. If we assume that the oxygen level in the shelter has to be maintained at a level sufficient to support normal activity levels, say 20–21%, then the decontaminated airstream entering the shelter must have an oxygen concentration greater than 20% to deliver usable oxygen. The amount of pure usable oxygen in the decontaminated airstream is given by the equation:

$$\text{Pure usable O}_2 \text{ flow rate} = \left(\begin{array}{c}\text{Decontaminated air}\\ \text{flow rate}\end{array}\right) \times \quad (3)$$

$$\left(\begin{array}{c}\text{Volume fraction O}_2 \text{ in}\\ \text{decontaminated air} - 0.20\end{array}\right)$$

If the pure usable oxygen requirement is fixed, the feed flow rate to the shelter decreases as the oxygen content of the decontaminated air increases. For example, if the feed flow rate is around 6,000 liters per minute (Lpm) and we assume that the oxygen concentration within the shelter is 20%, then the usable oxygen in the shelter feed is 60 Lpm. However, if the feed were enriched to 25% oxygen, then the same usable oxygen content could be maintained with a shelter feed of 1,200 Lpm. This example illustrates the advantages of an oxygen-enrichment system. As the feed to the shelter becomes more enriched in oxygen, the volume of air that must be decontaminated and the size of the decontamination unit decrease. Alternatively, the number of individuals the shelter can support, for the same volume of air supplied to the shelter, is substantially increased.

Figure 6:
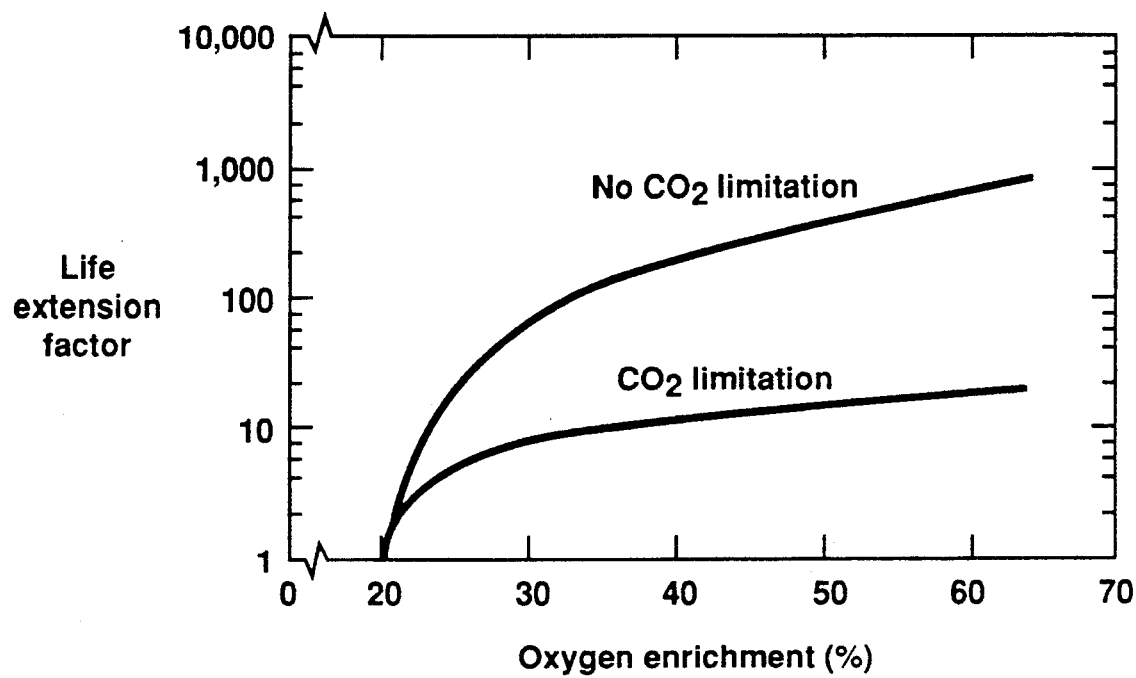
FIG. 6 is a plot of the life extension of a carbon filtration unit with a polyethersulfone membrane pretreatment system (a) limited by $CO_2$ removal, and (b) with no $CO_2$ limitation.

The life extension that may be achieved as a result of these two factors together is very substantial, as shown in Example 16 and FIG. 6. Extensions of the sorbent or filter lifetime such as 50 times, 100 times or 500 times are possible. In many cases, the sorbent would not need to be changed during an entire period of use of the shelter.

The invention has been described as it relates to a life-support system that includes a personnel shelter for protection against environments that contain hazardous organic chemical agents, such as industrial accidents, chemical warfare, etc. However, another aspect of the invention is a method for extending the life of carbon filters or other sorbent units. Such units are used, for example, to treat the air supply to clean rooms used for pharmaceutical or electronics manufacturing operations, and to maintain a controlled atmosphere in operating theatres, quarantine rooms and other medical facilities. In any such situation, the life of the sorbent unit could be dramatically increased by pretreating the feed to the sorbent unit. Such a system would include a membrane unit as described above. The membrane unit would produce an oxygen-enriched stream, depleted of hazardous organic agents, which stream would then be fed to the sorbent unit for removal of any remaining organic agent, and thence to the clean room, operating theatre, or wherever the air is required. Again, extensions of the sorbent or filter life by 50 or 100 times or more would be possible.

The invention is now further illustrated by the following examples, which are intended to be illustrative of the invention, but are not intended to limit the scope or underlying principles of the invention in any way.

EXAMPLES

EXAMPLE 1

An asymmetric support membrane was cast using the Loeb-Sourirajan technique discussed above. The casting solution was 17 wt % polysulfone in dimethylformamide. The membrane was cast onto a polyester web, precipitated in water, washed for 24 hours and dried in an oven at 80° C. Composite membranes were prepared by coating a solution of 1% polytrimethylpentene in cyclohexane onto the skin side of the asymmetric membrane using the dip-coating method described above. The membranes were tested to determine the pure gas permeation rates for oxygen and nitrogen. For the tests, disks 2.45 inches in diameter were cut from the sheet of membrane and were mounted in a high-pressure test cell which had feed, residue, and permeate flow connections. In the pure gas test, a pressurized pure gas stream was fed into the cell through the feed inlet. For these tests, the residue connection was sealed. The permeate flow rate was measured by venting the permeate outlet through a flowmeter and was used to determine the permeation rates of oxygen and nitrogen. The oxygen/nitrogen selectivity was then calculated from the ratio of the two permeation rates. The results are given in Table 1.

TABLE 1

| Membrane Permeation Data for Oxygen and Nitrogen | | | | |
|---|---|---|---|---|
| Permselective Material | Permeation Rate (cm³ (STP)cm/cm² · s · cmHg) | | Selectivity $\alpha O_2/N_2$ | Theoretical Selectivity $\alpha O_2/N_2$ |
| | Oxygen | Nitrogen | | |
| Poly (trimethylpentene) | $7.8 \times 10^{-5}$ | $2.3 \times 10^{-5}$ | 3.4 | 4.1[a] |

[a]Calculated from measurements of isotropic thick films
[b]Pusch, W., and Walch, A., "Synthetic Membranen-Herstellung, Struktur und Anwendung," Angew. Chem. Vol. 21, p. 660 (1982).
[c]Peinemann, K.-V., Pinnau, I., and Wind, J., "Polyethersulfone and presented at International Workshop on Membranes for Gas and Vapor Separations, Qiryat Anavim, Israel (1988).

EXAMPLE 2

An asymmetric support membrane was cast as in Example 1 above. Composite membranes were prepared by coating a solution of 1% ethylcellulose in 2-propanol onto the skin side of the asymmetric method using the dip-coating method described above. The membranes were tested to determine the pure gas permeation rates for oxygen and nitrogen, using the same experimental technique as in Example 1. The results are given in Table 2.

TABLE 2

| Membrane Permeation Data for Oxygen and Nitrogen | | | | |
|---|---|---|---|---|
| Permselective Material | Permeation Rate (cm³ (STP)cm/cm² · s · cmHg) | | Selectivity $\alpha O_2/N_2$ | Theoretical Selectivity $\alpha O_2/N_2$ |
| | Oxygen | Nitrogen | | |
| Ethylcellulose | $2.8 \times 10^{-5}$ | $6.9 \times 10^{-6}$ | 4.1 | 4.1[a] |

[a]Calculated from measurements of isotropic thick films
[b]Pusch, W., and Walch, A., "Synthetic Membranen-Herstellung, Struktur und Anwendung," Angew. Chem. Vol. 21, p. 660 (1982).
[c]Peinemann, K.-V., Pinnau, I., and Wind, J., "Polyethersulfone and Polyetherimide Membranes with High Selectivities for Gas Separation," paper presented at International Workshop on Membranes for Gas and Vapor Separations, Qiryat Anavim, Israel (1988).

EXAMPLE 3

An asymmetric support membrane was cast as in Example 1 above. Composite membranes were prepared by coating a solution of 1% ethylcellulose in 2-propanol onto the skin side of the asymmetric method using the dip-coating method described above. The membranes were then overcoated with a solution of 1% polytrimethylpentene in cyclohexane. The membranes were tested to determine the pure gas permeation rates for oxygen and nitrogen, using the same experimental technique as in Example 1. The results are given in Table 3.

TABLE 3

Membrane Permeation Data for Oxygen and Nitrogen

| Perm-selective Material | Permeation Rate (cm$^3$ (STP)cm/cm$^2 \cdot$ s $\cdot$ cmHg) Oxygen | Nitrogen | Selectivity $\alpha O_2/N_2$ | Theoretical Selectivity $\alpha O_2/N_2$ |
|---|---|---|---|---|
| Ethylcellulose/ Poly(trimethylpentene) | 6.3 × 10$^{-5}$ | 1.7 × 10$^{-5}$ | 3.7 | 4.1[a] |

[a]Calculated from measurements of isotropic thick films
[b]Pusch, W., and Walch, A., "Synthetic Membranen-Herstellung, Struktur und Anwendung," Angew. Chem. Vol. 21, p. 660 (1982).
[c]Peinemann, K.-V., Pinnau, I., and Wind, J., "Polyethersulfone and Polyetherimide Membranes with High Selectivities for Gas Separation," paper presented at International Workshop on Membranes for Gas and Vapor Separations, Qiryat Anavim, Israel (1988).

EXAMPLE 4

An asymmetric support membrane was cast using the same general technique as in Example 1 above, but using polyamide as the membrane polymer, and making a casting solution of 18% polyamide in 3% acetic acid and 79% N,N-dimethylformamide. Composite membranes were prepared by coating a solution of poly(1-trimethylsilylpropyne) in toluene and cyclohexane onto the skin side of the asymmetric membrane using the dip-coating method described abpve. The membranes were tested to determine the pure gas permeation rates for oxygen and nitrogen, using the same experimental technique as in Example 1. The results are given in Table 4.

TABLE 4

Membrane Permeation Data for Oxygen and Nitrogen

| Perm-selective Material | Permeation Rate (cm$^3$ (STP)cm/cm$^2 \cdot$ s $\cdot$ cmHg) Oxygen | Nitrogen | Selectivity $\alpha O_2/N_2$ | Theoretical Selectivity $\alpha O_2/N_2$ |
|---|---|---|---|---|
| Poly(1-trimethylsilyl-1-propyne) | 6.75 × 10$^{-5}$ | 4.9 × 10$^{-5}$ | 1.4 | 1.4[a] |

[a]Calculated from measurements of isotropic thick films
[b]Pusch, W., and Walch, A., "Synthetic Membranen-Herstellung, Struktur und Anwendung," Angew. Chem. Vol. 21, p. 660 (1982).
[c]Peinemann, K.-V., Pinnau, I., and Wind, J., "Polyethersulfone and Polyetherimide Membranes with High Selectivities for Gas Separation," paper presented at International Workshop on Membranes for Gas and Vapor Separations, Qiryat Anavim, Israel (1988).

EXAMPLE 5

An asymmetric membrane was cast using the Loeb-Sourirajan technique discussed above. The casting solution was 14.4 wt % polyethersulfone in a solvent mix of 47.9% methylene chloride, 24% 1,1,2-trichloroethane, 6% formic acid and 7.7% 2-butanol. The membrane was hand cast onto a glass plate using a spreader roller. The glass plate was immersed in a nonsolvent bath, causing the polymer to precipitate and form the membrane. After the precipitation was complete, the membrane was removed from the bath and dried. The membrane was coated with a silicone rubber solution to deposit a very thin sealing layer to plug any defects in the permselective skin.

The membrane was tested to determine the pure gas permeation rates for oxygen and nitrogen. For the tests, disks 2.45 inches in diameter were cut from the sheet of membrane and were mounted in a high-pressure test cell which had feed, residue, and permeate flow connections. In the pure gas test, a pressurized pure gas stream was fed into the cell through the feed inlet. For these tests, the residue connection was sealed. The permeate flow rate was measured by venting the permeate outlet through a flowmeter and was used to determine the permeation rates of oxygen and nitrogen. The oxygen/nitrogen selectivity was then calculated from the ratio of the two permeation rates. The results are given in Table 5.

TABLE 5

Membrane Permeation Data for Oxygen and Nitrogen

| Perm-selective Material | Permeation Rate (cm$^3$ (STP)cm/cm$^2 \cdot$ s $\cdot$ cmHg) Oxygen | Nitrogen | Selectivity $\alpha O_2/N_2$ | Theoretical Selectivity $\alpha O_2/N_2$ |
|---|---|---|---|---|
| Poly(ethersulfone) | 1.28 × 10$^{-5}$ | 1.46 × 10$^{-6}$ | 8.8 | 9.0[c] |

[a]Calculated from measurements of isotropic thick films
[b]Pusch, W., and Walch, A., "Synthetic Membranen-Herstellung, Struktur und Anwendung," Angew. Chem. Vol. 21, p. 660 (1982).
[c]Peinemann, K.-V., Pinnau, I., and Wind, J., "Polyethersulfone and Polyetherimide Membranes with High Selectivities for Gas Separation," paper presented at International Workshop on Membranes for Gas and Vapor Separations, Qiryat Anavim, Israel (1988).

EXAMPLE 6

An asymmetric membrane was cast using the Loeb-Sourirajan technique discussed above. The casting solution was 15 wt % polyphenylene oxide in a solvent mix of 1,1,2-trichloroethylene and 1-octanol. The membrane preparation technique was as in Example 5. The membrane was coated with a sealing layer of silicone rubber. The test results are given in Table 6.

TABLE 6

Membrane Permeation Data for Oxygen and Nitrogen

| Perm-selective Material | Permeation Rate (cm$^3$ (STP)cm/cm$^2 \cdot$ s $\cdot$ cmHg) Oxygen | Nitrogen | Selectivity $\alpha O_2/N_2$ | Theoretical Selectivity $\alpha O_2/N_2$ |
|---|---|---|---|---|
| Poly(phenylene oxide) | 3.2 × 10$^{-5}$ | 6.5 × 10$^{-6}$ | 5.0 | 5.0[b] |

[a]Calculated from measurements of isotropic thick films
[b]Pusch, W., and Walch, A., "Synthetic Membranen-Herstellung, Struktur und Anwendung," Angew. Chem. Vol. 21, p. 660 (1982).
[c]Peinemann, K.-V., Pinnau, I., and Wind, J., "Polyethersulfone and Polyetherimide Membranes with High Selectivities for Gas Separation," paper presented at International Workshop on Membranes for Gas and Vapor Separations, Qiryat Anavim, Israel (1988).

EXAMPLE 7

An asymmetric polyetherimide membrane was obtained from GKSS, of Geesthacht, West Germany. The membrane was overcoated with a thin layer of silicone rubber, to seal any defects, then tested according to the same procedure as for Example 6. The results are given in Table 7.

TABLE 7

Membrane Permeation Data for Oxygen and Nitrogen

| Perm-selective Material | Permeation Rate (cm$^3$ (STP)cm/cm$^2 \cdot$ s $\cdot$ cmHg) Oxygen | Nitrogen | Selectivity $\alpha O_2/N_2$ | Theoretical Selectivity $\alpha O_2/N_2$ |
|---|---|---|---|---|
| Poly(etherimide) | 4.5 × 10$^{-6}$ | 6 × 10$^{-7}$ | 7.5 | 8.0[c] |

[a]Calculated from measurements of isotropic thick films
[b]Pusch, W., and Walch, A., "Synthetic Membranen-Herstellung, Struktur und Anwendung," Angew. Chem. Vol. 21, p. 660 (1982).
[c]Peinemann, K.-V., Pinnau, I., and Wind, J., "Polyethersulfone and Polyetherimide Membranes with High Selectivities for Gas Separation," paper presented at International Workshop on Membranes for Gas and Vapor Separations, Qiryat Anavim, Israel (1988).

By comparing the oxygen/nitrogen selectivity obtained in Examples 1-7 to the polymer's theoretical selectivity, the presence and extent of membrane defects can be determined. We consider a membrane to be defect-free if its oxygen/nitrogen permeability ratio is 90% of its theoretical value. All of the membranes exhibited oxygen/nitrogen permeation ratios that were close to the theoretical value for the polymers, indicating that the membranes were essentially defect-free.

Membranes with a high selectivity to oxygen over nitrogen are suitable for oxygen-enrichment systems since they produce permeate streams with high oxygen content.

EXAMPLE 8

Simulant Selection

A list of some representative toxic agents that may be encountered under conditions of chemical warfare is given in Table 8. Other toxic agents include nerve agent GA, choking agents, such as phosgene, incapacitating agents CN and CS, and toxins such as Butolin X, A, Saxitoxin TZ and enterotoxin B. In general, as the molecular weight increases, the saturation vapor pressure decreases, but the toxicity increases greatly. For example, agent GB is approximately 120 times less volatile than agent CK, but its relative toxicity is 100 times greater. Therefore, the agents are likely to be encountered at moderate to low concentrations, and the toxicity levels will require lowering the agent concentration in the treated air down to the ppb or ppt levels.

To evaluate the performance of membranes in resisting the permeation of such agents, we selected a number of nontoxic simulants for chemical warfare agents based on their similar volatility and molecular size. These included toluene, dipentene, and CFC-11 (Freon-11, fluorotrichloromethane).

All of the materials used were obtained as analytical grade reagents except for dipentene, which was obtained as a (75:25) mixture with p-cymene (4-$(CH_3)_2CHC_6H_4CH_3$). The two chemicals were detected independently by the gas chromatograph and, therefore, we were able to separately determine the permeation rates of dipentene and p-cymene. Only the dipentene permeation rate was considered for calculating the oxygen/simulant selectivity. The chemical structure and physical properties of these simulants are listed in Table 9.

TABLE 8

| Representative chemical warfare agents | |
|---|---|
| Blister Agents | |
| Mustard | |
| $ClCH_2CH_2SCH_2CH_2Cl$ | |
| Nerve Agents | |
| GB | VX |
| 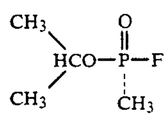  | 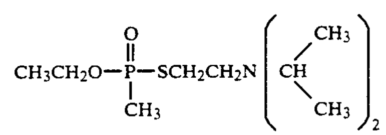  |
| Blood Agents | |
| CK | AC |
| ClC≡N | HC≡N |
| Incapacitating Agents | |
| BZ | Oripavines |
| 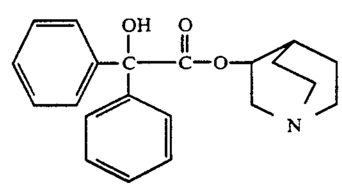  | 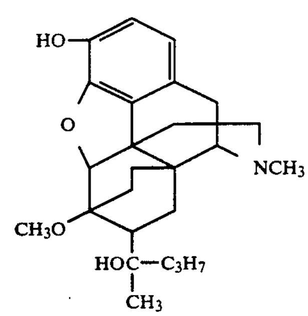  |
| Mycotoxins | |
| Nivalenol | T-2 |
| 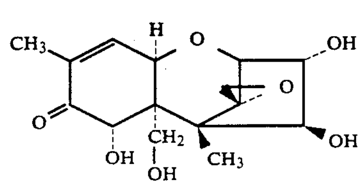  | 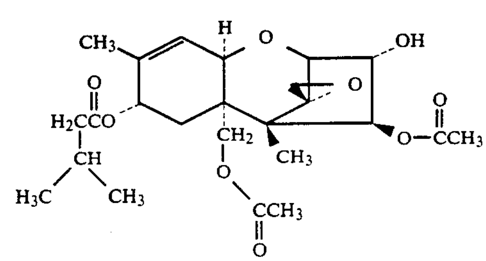  |

TABLE 9

Simulants selected to model chemical warfare agents

| SIMULANT | MOLECULAR WEIGHT (g) | VAPOR PRESSURE (mmHg at 25° C.) |
|---|---|---|
| TOLUENE (C₆H₅–CH₃) | 92.13 | 28.5 |
| DIPENTENE | 136.24 | 2.0 |
| FREON-11 (Cl–C(Cl)(F)–Cl) | 137.4 | 760 |

EXAMPLE 9

The polyethersulfone asymmetric membranes prepared in Example 5 were tested for permeation performance with mixture of air and simulant vapor. Membrane disks were cut and mounted in a test cell as for the pure gas experiments. For the mixture tests, the liquid simulant agent was introduced into a pressure vessel, and compressed air from a commercial cylinder was bubbled through the liquid to produce a simulant-saturated stream. The saturated stream was blended with dry air to achieve the desired simulant concentration, and this stream was fed into the membrane test cell. As the feedstream swept across the membrane surface, an oxygen-enriched fraction selectively permeated the membrane; the oxygen-depleted and simulant-enriched residue exited the cell through the residue port. The test apparatus was connected to a gas chromatograph equipped with a flame-ionization detector (Hach Carle Series 100 AGC, Hach Co., Loveland, Colo.) and an oxygen analyzer (XP-204, Gastech Inc., Newark, Calif.). Flowmeters were connected to the residue and permeate lines.

All experiments were carried out with a 100-psig feed stream. The membrane stage-cut, defined as the ratio of the permeate flow rate to the feed flow rate, was always kept at less than 0.02 by adjusting the inlet flow regulating valve. During the experiment, the simulant concentration in the feed, residue and permeate streams was determined using the gas chromatograph. The oxygen content of these streams was determined using the oxygen analyzer. The residue and permeate flow rates were measured with the flowmeters; the feed flow rate was calculated as the sum of these two flow rates.

The membrane cell approximated a perfectly mixed permeation cell because of the low stage-cut used. Since only a small fraction of the feedstream permeated the membrane, there was relatively little variation in concentration throughout the feed chamber. Thus, the cell represented an "ideally mixed" element and the relative permeation rates of oxygen and simulant were in proportion to their concentrations in the permeate stream. This enabled us to calculate the oxygen/simulant selectivity for the membrane as $$\alpha_{(O_2/A)} = \frac{y_{O_2}}{y_A} \times \left( \frac{P_F x_A - P_P y_A}{P_F x_{O_2} - P_P y_{O_2}} \right), \quad (4)$$

where
$\alpha_{(O_2/A)}$ = oxygen/simulant selectivity
$y_{O_2}$ = mole fraction of oxygen in the permeate
$x_{O_2}$ = mole fraction oxygen in the feed
$y_A$ = mole fraction of the simulant in the permeate
$x_A$ = mole fraction of the simulant in the feed
$P_F$ = feed pressure
$P_P$ = permeate pressure.

The permeability data for the polyethersulfone membranes are shown in Table 10.

TABLE 10

Oxygen/Agent Selectivity Data for Polyethersulfone Membranes

| | Feed Composition | | Permeation Rate $\left( \frac{cm^3(STP)}{cm^2 \cdot s \cdot cmHg} \right)$ | Permeate Composition | | O₂/Agent Selectivity |
|---|---|---|---|---|---|---|
| | Oxygen (%) | Agent (ppm) | | Oxygen (%) | Agent (ppm) | |
| Toluene | 24 | 235 | $1.89 \times 10^{-6}$ | 60 | 2.8 | 310 |
| Dipentene | 24 | 210 | $1.51 \times 10^{-6}$ | 61 | 7.1 | 110 |
| Freon ®-11 | 24 | 252 | $9.45 \times 10^{-7}$ | 66 | 8.7 | 120 |

EXAMPLE 10

The polyphenylene oxide asymmetric membranes prepared in Example 6 were tested for permeation performance with mixtures of air and simulant vapor. Membrane disks were cut and mounted in a test cell as for the pure gas experiments. The experimental technique was as described in Example 9. The permeability data for the polyphenylene oxide membranes are shown in Table 11.

TABLE 11

Oxygen/Agent Selectivity Data for Poly(phenylene oxide) Membranes

| | Feed Composition | | Permeation Rate $\left( \frac{cm^3(STP)}{cm^2 \cdot s \cdot cmHg} \right)$ | Permeate Composition | | O₂/Agent Selectivity |
|---|---|---|---|---|---|---|
| | Oxygen (%) | Agent (ppm) | | Oxygen (%) | Agent (ppm) | |
| Toluene | 23 | 90 | $1.04 \times 10^{-6}$ | 51 | 0 | >550$^a$ |

TABLE 11-continued

Oxygen/Agent Selectivity Data for Poly(phenylene oxide) Membranes

| | Feed Composition Oxygen (%) | Agent (ppm) | Permeation Rate $\left(\dfrac{cm^3(STP)}{cm^2 \cdot s \cdot cmHg}\right)$ | Permeate Composition Oxygen (%) | Agent (ppm) | $O_2$/Agent Selectivity |
|---|---|---|---|---|---|---|
| | 24 | 385 | membrane unstable; fractured | | | |
| | 24 | 1277 | membrane unstable; fractured | | | |
| Dipentene | 22.5 | 54 | $1.89 \times 10^{-7}$ | 50 | 0 | >330[a] |
| | 22.5 | 358 | $2.84 \times 10^{-7}$ | 51 | 0 | >2300[a] |
| Freon ®-11 | 24 | 448 | $4.73 \times 10^{-7}$ | 51 | 4 | 330 |

[a]Minimum selectivity calculated for a lower detection limit of 0.5 ppm

The results shows that the membranes are very selective to the permeation of oxygen over simulant for dipentene and Freon-11. However, the membranes are unable to perform satisfactorily in the presence of toluene vapor and exhibit poor rejection of toluene except at low concentrations. At high concentrations of toluene vapor, the membrane underwent a structural transformation and distintegrated with dramatic reductions in permeation selectivity.

EXAMPLE 11

The polyetherimide membranes used in Example 7 were tested for permeation performance with mixtures of air and simulant vapor. Membrane disks were cut and mounted in a test cell as for the pure gas experiments. The experimental technique was as described in Example 9. The permeability data for the polyetherimide membranes are shown in Table 12.

TABLE 12

Oxygen/Agent Selectivity Data for Polyetherimide Membranes

| Permselective Material | Feed Composition Oxygen (%) | Agent (ppm) | Permeation Rate $\left(\dfrac{cm^3(STP)}{cm^2 \cdot s \cdot cmHg}\right)$ | Permeate Composition Oxygen (%) | Agent (ppm) | $O_2$/Agent Selectivity |
|---|---|---|---|---|---|---|
| Toluene | 24 | 49 | $1.30 \times 10^{-6}$ | 58 | 1.8 | 95 |
| Dipentene | 24 | 263 | $5.67 \times 10^{-7}$ | 55 | 327 | 2.2 |
| Freon-11 | 24 | 555 | $8.51 \times 10^{-7}$ | 49 | 575 | 2.3 |

The results show that these membranes performed well with toluene vapors, producing an oxygen-enriched permeate stream while rejecting the permeation of toluene. However, in tests with dipentene and Freon-11, the membrane showed poor selectivity to the permeation of oxygen over simulant. Furthermore, the membrane produced a slight enrichment of the simulant in the permeate stream.

EXAMPLE 12

The composite membranes of Examples 1–4 were tested with simulant/air mixtures as in Examples 9–11 above. The only simulant vapor used in this case was toluene. The results are given in Table 13. None of the membranes tested had satisfactory selectivity characteristics for this simulant.

TABLE 13

Oxygen/Toluene Selectivity Data for Moderately Glassy Composite Polymer Membranes

| Permselective Material | Feed Composition Oxygen (%) | Toluene (ppm) | Permeation Rate $\left(\dfrac{cm^3(STP)}{cm^2 \cdot s \cdot cmHg}\right)$ | Permeate Composition Oxygen (%) | Toluene (ppm) | $O_2$/Toluene Selectivity |
|---|---|---|---|---|---|---|
| Poly(1-tri methylsilyl-1-propyne) | 22.5 | 34 | $5.1 \times 10^{-5}$ | 28.5 | 108 | 0.29 |
| Poly(tri-methyl-pentene) | 24 | 60 | $3.3 \times 10^{-5}$ | 45 | 334 | 0.13 |
| Ethyl-cellulose | 24 | 40 | $7.9 \times 10^{-6}$ | 51 | 75 | 1.2 |
| Ethyl-cellulose/ | 24 | 37 | $1.7 \times 10^{-5}$ | 50 | 126 | 0.47 |
| Poly(tri-methylpentene) blend | 24.5 | 49 | $1.2 \times 10^{-5}$ | 52 | 203 | 0.34 |

EXAMPLE 13

A series of permeation experiments was performed to assess the potential performance of a second membrane unit, containing a permselective membrane made from a rubbery polymer, in producing a nitrogen-enriched stream that could be used as a sweep stream in conjunction with the oxygen-enriched stream from the first membrane unit. For the experiments, we used CFC-11 (Freon-11) as a simulant vapor. All sample feedstreams were evaluated in a laboratory test system containing one membrane module with a permselective silicone rubber membrane and membrane area of approximately 2,000 cm². The air in the feed cycle was replaced with nitrogen from a pressure cylinder prior to the experiment. Nitrogen was continuously fed into the system during the experiment to replace the lost nitrogen into the permeate. CFC-11 vapor was continuously fed into the system by either pumping liquid solvent into the residue line using a syringe pump and evaporating the solvent using additional heating, or sending a bypass stream of the residue through a wash bottle containing the liquid solvent. The feed and residue organic concentrations were determined by withdrawing samples from the appropriate lines by syringe and then subjecting these to gas chromatograph (GC) analysis. Liquid nitrogen traps were used to condense the CFC-11 contained in the permeate stream. The samples from the permeate stream were taken using a detachable glass vessel constantly purged with a bypass stream of the permeate. Upon sampling, the vessel was detached and air was allowed to enter the vessel. The concentration in the vessel was determined by gas chromatography. The permeate concentration was then calculated from the relationship:

permeate conc. = conc. in vessel × $\left( \dfrac{76 \text{ cmHg}}{\text{permeate pressure (cmHg)}} \right)$.

The procedure for a test with the system was as follows:
1. The system was run without solvent under maximum permeate vacuum to replace the air in the loop with nitrogen.
2. The nitrogen permeate flow rate was determined by measuring the vacuum pump exhaust flow rate. This provided a quality check on the module.
3. The feed flow, feed pressure and permeate pressure were adjusted to the desired values. The cold trap was filled with liquid nitrogen.
4. The solvent input was started and the feed concentration was monitored frequently. The permeate pressure was adjusted if necessary.
5. The system was run until steady state was reached.
6. All parameters were recorded and a permeate sample was taken and analyzed.
7. Step 6 was repeated after 10-20 minutes. Feed concentration was monitored after each parameter change to ensure steady state had been reached.

The experimental procedures described were carried out using a feedstream containing CFC-11 (CCl₃F) in concentrations from 100-2,000 ppm. The CFC/N₂ selectivity of the module increased slightly from 22 at 100 ppm to 28 at 2,000 ppm.

EXAMPLE 14

The experimental procedures described were carried out using a feedstream containing CFC-11 (CCl₃F) in concentrations from 1-35 vol %. The CFC/N₂ selectivity of the module increased from 30 at 1 vol % to 50 at 35 vol %. This effect may be attributable to plasticization of the membrane material by sorbed hydrocarbon. Both hydrocarbon and nitrogen fluxes increased with increasing hydrocarbon feed concentration.

EXAMPLE 15

A series of permeation experiments was performed to assess the potential performance of a membrane unit in removing carbon dioxide from air withdrawn from the personnel shelter. For the experiments, a composite membrane was made by coating the skin side of an asymmetric polyamide membrane with a solution of 1.5% Pebax ® 3533 in 1,1,2-trichloroethane. Pebax is a block copolymer having the general formula:

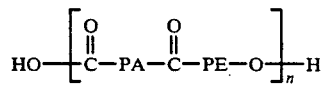

wherein PA is a saturated aliphatic polyamide segment, PE is a polyether segment, and n is a positive integer. Membrane disks were cut as in Example 1 and the experimental procedure was as in Example 1. The membranes were tested with pure gas samples of carbon dioxide, oxygen and nitrogen. The results are given in Table 14.

TABLE 14

| | Permeation properties of Pebax ® 3533 composite membranes | | | | | |
|---|---|---|---|---|---|---|
| Coating | P/lCO₂ [cm³(STP)/cm² sec · cm Hg] | P/lO₂ | P/lN₂ | αO₂/N₂ | αCO₂/N₂ | αCO₂/O₂ |
| 1 × 1.5 wt % Pebax ® 3533 in 1,1,2-trichloroethane | | | | | | |
| 1 | 8.1 × 10⁻⁵ | 8.0 × 10⁻⁶ | 3.0 × 10⁻⁶ | 2.7 | 27.0 | 10.1 |
| 2 | 1.4 × 10⁻⁴ | 1.4 × 10⁻⁵ | 5.3 × 10⁻⁶ | 2.6 | 26.4 | 10.0 |
| 3 | 1.0 × 10⁻⁴ | 9.5 × 10⁻⁶ | 3.9 × 10⁻⁶ | 2.4 | 25.6 | 10.5 |

EXAMPLE 16

System Design Calculations

Based on the experimental data of Examples 1-15, we used a computer program to analyze the design of membrane systems for producing oxygen-enriched air from a chemically contaminated environment. The computer model was based on the crossflow gas separation module design equations developed by Weller and Steiner (Weller, S. and Steiner, W. A., "Fractional Permeation Through Membranes," Chem. Eng. Prog. Vol 46, p 585-91 (1950)) and Pan and Habgood (Pan, C. Y. and Habgood, H. W., "An Analysis of the Single-Stage Gaseous Permeation Process," Ind. Eng. Chem. Fund. Vol 13, p 323-31 (1974)).

The input specifications included the membrane permeability and selectivity properties, the feed air quality and the desired permeate stream quality. The program then calculated the membrane area and compression energy requirements for the system. We based our calculations on polyethersulfone membranes, which had the best performance in the experimental work.

In the design calculations, we considered a system delivering 20 Lpm of usable oxygen, sufficient for 20 persons. The minimum concentration of oxygen in the shelter was set at 20%. The carbon dioxide concentration was not allowed to exceed 1%, which is the 24- hour exposure limit. The oxygen/agent selectivity was assumed to be 100, a conservative estimate since the polyethersulfone membrane exceeded this value for all three simulants tested. The design specifications are summarized in Table 15. The table also contains the permeability data for the silicone membranes which could be used to produce a nitrogen-enriched sweep stream or in a carbon dioxide removal unit.

TABLE 15

Design Specifications for the Membrane Detoxification/Oxygen-Enrichment Unit

| Membrane System Feed Stream Composition | |
| --- | --- |
| Nitrogen | 78.97% |
| Oxygen | 21.00% |
| Carbon dioxide | 0.03% |
| Agent | 1,000 ppm |

Feed pressure = 103 psig
Permeate pressure = atmospheric pressure (14.7 psia)

| | Membrane Permeation Rates $(cm^3(STP)/cm^2 \cdot s \cdot cmHg)$ | |
| --- | --- | --- |
| Component | Polyethersulfone | Silicone Rubber |
| Nitrogen | $1.70 \times 10^{-6}$ | $5.00 \times 10^{-5}$ |
| Oxygen | $1.50 \times 10^{-5}$ | $1.00 \times 10^{-4}$ |
| Carbon Dioxide | $9.20 \times 10^{-5}$ | $5.56 \times 10^{-4}$ |
| Agent | $1.50 \times 10^{-7}$ | $2.50 \times 10^{-3}$ |

Shelter
Usable oxygen requirement = 20 Lpm
Minimum oxygen concentration = 20%
Maximum carbon dioxide concentration = 1%

The stage cut of a membrane system is defined as the ratio of the permeate flow rate to the feed flow rate. At low stage-cut, only a small fraction of the feed permeates the membrane and, hence, the permeate is very concentrated in the most permeable component. As the stage-cut is increased, a greater fraction of the feed permeates the membrane which increases the level of the less permeable compoinents in the permeate stream. Therefore, at low stage-cut, the oxygen content of the permeate stream is maximum, while the toxic agent concentration is minimum. As the stage-cut increases, the quantity of nitrogen and agent permeating the membrane increases relative to oxygen. Hence, the permeate stream has a higher concentration of toxic agent and less oxygen enrichment. Permeate quality is maximized by maintaining the stage-cut as low as possible.

The energy and membrane area requirements for the system are affected by respiratory carbon dioxide, which limits the system performance. Without a separate carbon dioxide removal unit, carbon dioxide is removed in the shelter exhaust. In this case, it is necessary to maintain sufficiently large exhaust and feed flow rates to ensure that the carbon dioxide within the shelter is diluted to safe levels. However, an increased flow rate to the shelter means that the stage-cut of the membrane system must be increased, producing a permeate stream with a lower degree of oxygen enrichment. Therefore, the size of the membrane system and the energy required will be affected accordingly.

Figure 4:
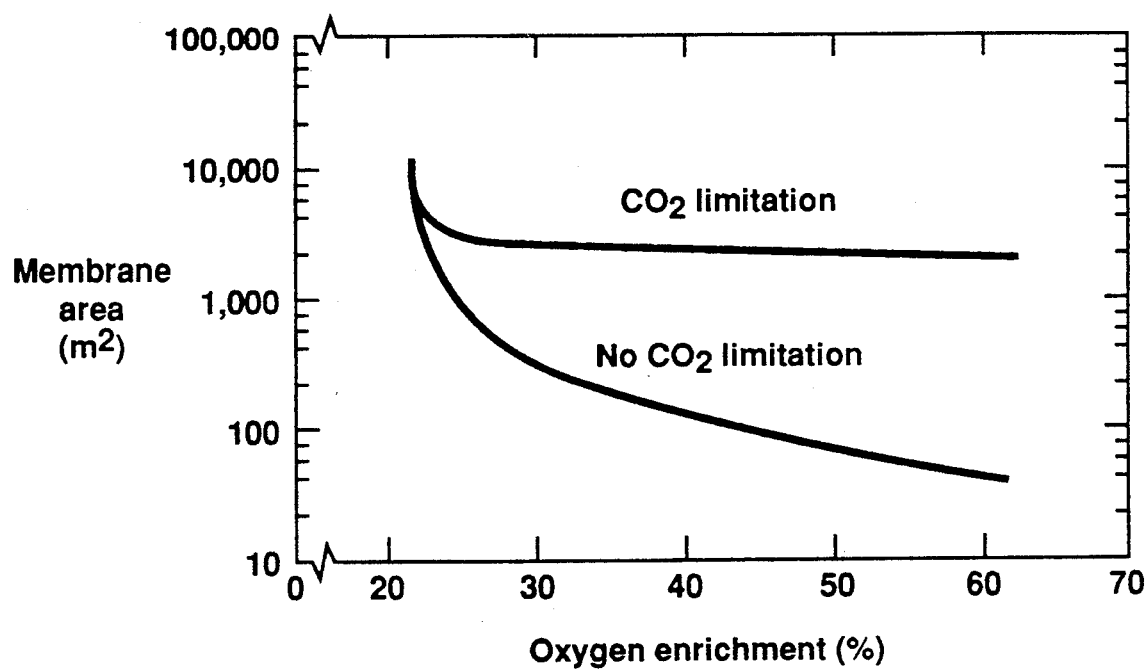
FIG. 4 is a plot of membrane area required as a function of oxygen enrichment in the permeate for a system delivering 20 Lpm of usable oxygen (a) limited by $CO_2$ removal, and (b) with no $CO_2$ limitation.
Figure 5:
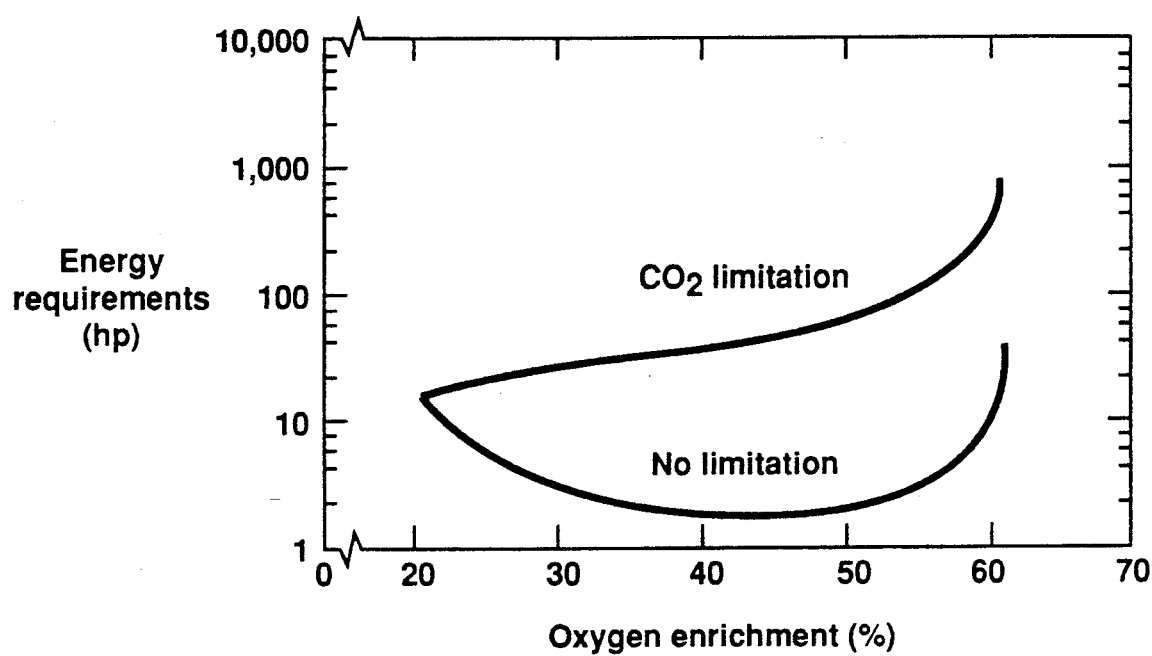
FIG. 5 is a plot of membrane system energy requirements as a function of oxygen enrichment in the permeate for a system delivering 20 Lpm usable oxygen (a) limited by $CO_2$ removal, and (b) with no $CO_2$ limitation.

FIGS. 4 and 5 present the membrane system area and energy requirements as a function of the oxygen concentration in the permeate, with and without a separate carbon dioxide removal unit. A system that is not limited by carbon dioxide would include an active carbon dioxide removal unit, which selectively removes the carbon dioxide from the shelter atmosphere, reducing its concentration to the desired level.

FIG. 4 is a plot of membrane area required as a function of oxygen enrichment in the permeate for a system delivering 20 Lpm of usable oxygen (a) limited by $CO_2$ removal, and (b) with no $CO_2$ limitation. The membrane material is polyethersulfone and the feed air is assumed to contain 21% oxygen and 1,000 ppm toxic agent. The shelter oxygen concentration is 21%. FIG. 4 shows that the required membrane area decreases as the level of oxygen enrichment is increased. The rate of decrease in membrane area is larger for a system not limited by carbon dioxide; that is, a system with no carbon dioxide limitations requires 100 times less membrane area than a carbon dioxide-limited system. As the oxygen concentration in the permeate increases, the usable oxygen content of the permeate stream also increases and consequently less membrane area is required to maintain a given usable oxygen flow. The rate of decrease in required membrane area is not as great for the carbon dioxide-limited system because the usable oxygen depends more on the carbon dioxide dilution rate than the oxygen content of the permeate stream.

The energy requirements for the membrane system increase with the oxygen content of the permeate stream, as shown in FIG. 5. FIG. 5 is a plot of membrane system energy requirements as a function of oxygen enrichment in the permeate for a system delivering 20 Lpm usable oxygen (a) limited by $CO_2$ removal, and (b) with no $CO_2$ limitation. The membrane material is polyethersulfone and the feed air contains 21% oxygen and 1,000 ppm toxic agent. The shelter oxygen concentration is 21%. At high permeate oxygen concentrations, the energy requirement increases rapidly to high levels. This is due to the relationship between the oxygen concentration in the permeate and the system stage-cut. At a low stage-cut, the main component of the permeate stream is the most permeable species, i.e., oxygen. However, because of the low stage-cut, most of the feed air that is compressed to the system feed pressure must be discarded in the residue stream. This energy loss dominates the total energy consumption and, hence, the energy requirements for the system are very high. As the stage-cut increases, the permeate oxygen concentration and the energy requirements decrease. However, as the stage-cut increases further, the lower oxygen concentration in the permeate results in a decrease in the usable oxygen flow. Consequently, the volume of the shelter feed has to be increased. This results in an increase in the compression energy required. This behavior is characteristic of systems without carbon dioxide limitations. For a system with design specifications as in Table 15, the compression energy is minimum for a permeate containing 45% oxygen.

An important advantage of the membrane oxygen-extraction unit is that it extends the life of the sorbent unit, effectively eliminating filter replacement. The life extension of the filter unit is defined as:

Load on carbon filter unit =

$$\text{Mass of air treated} \left( \begin{array}{c} \text{Agent concentration in the inlet stream} - \\ \text{Agent concentration in the treated air} \end{array} \right)$$

Life extension of a carbon filter unit =

$$\frac{\text{Load on a stand-alone filter unit}}{\text{Load on the filter unit in a membrane hybrid system}}$$

FIG. 6 is a plot of the life extension of a carbon filtration unit with a polyethersulfone membrane pretreatment system. The system removes all the toxic agent from a feedstream containing 1,000 ppm toxic agent. The usable oxygen in the treated stream is 20 Lpm to a shelter with ambient oxygen concentration of 21%. The life extension is attributed to two factors. First, the membrane system removes most of the toxic agent from the feed air, reducing the load on the carbon filter. Second, because the food to the shelter is enriched in oxygen, a smaller volume flow is required for sustaining the shelter. Hence, the volume of air treated is smaller and the life of the filter unit is proportionately increased. Systems that operate under carbon dioxide-limiting conditions produce streams with low usable oxygen content. In these systems, the volume of air that must be treated is not decreased and the life extension is between 10 and 20. However, in systems without this limitation, the life of the filter is extended by up to a factor of 1,000, as shown in FIG. 6. Such a system would essentially eliminate the need for filter replacement.

If the air within the shelter is treated to prevent the accumulation of carbon dioxide, the membrane area and system energy requirements are optimal when the oxygen content of the permeate is 56% for the system described in FIGS. 4 and 5. Higher oxygen concentrations would require greater energy, while a decrease in the oxygen concentration would increase the membrane area needed. A system producing 20 Lpm of usable oxygen would require a 4-hp compressor and would use 50 $m^2$ of membrane area, equivalent to four 8-inch diameter, 40-inch long modules. The membrane system would produce a stream from which 95% of the toxic agent initially present had been removed, increasing the life of the carbon filter by a factor of 675.

Using the system design parameters of Table 15, and the design considerations discussed above, the membrane area, energy consumption and performance of the system designs of FIGS. 1, 2 and 3 were calculated. The results are given in Table 16. The table also gives the same calculations performed for systems designs in accordance with the fourth and fifth configurations, using oxygen and toxic agent selective membranes, discussed herein before.

TABLE 16

Performance Evaluation of Systems Delivering 20 Lpm Usable Oxygen

| System type | Life extension of filter unit | Membrane area ($m^2$) | System energy (hp) | Shelter feed flow rate (Lpm) | Oxygen conc. in permeate stream (%) |
|---|---|---|---|---|---|
| FIG. 1 | 52 | 600 | 22 | 500 | 44 |
| FIG. 2 | 10 | 80 | 18.5 | 2,040 | 21 |
| FIG. 3 | 205 | 50 | 6.8 | 200 | 30 |
| Configuration #4 | 102 | 58 | 23 | 2,020 | 18 |
| Configuration #5 | 71 | 35 | 15 | 1,460 | 18 |

In the configuration of FIG. 1, the carbon dioxide removal is achieved by a membrane scrubber unit, which selectively strips the carbon dioxide from the shelter atmosphere and rejects it to the atmosphere. This system supplies an oxygen-enriched stream containing 44.2% oxygen to the shelter. The membrane scrubber removes the carbon dioxide from the shelter as a stream containing 40.4% oxygen and 3.5% carbon dioxide. The life of the carbon filter in this system is extended by a factor of 52. The performance of the system could be improved by using a more selective carbon dioxide removal unit.

In the configuration of FIG. 2, the polyethersulfone membrane unit provides 3% of the total feed flow and all of the usable oxygen. The remaining 97% of the flow is a sweep generated by a second silicone rubber membrane unit. The large surplus flow dilutes the carbon dioxide produced within the shelter and carries it out in the shelter exhaust. The shelter feed is not enriched in oxygen and hence the feed flow rate is on the order of that in a conventional filtration system. Therefore, the life extension of the filter is solely that which is due to the removal of toxic agent by the membranes. This membrane system reduces the agent concentration tenfold, resulting in a filter life extension of ten. If the system is not limited by energy consumption of membrane area constraints, the membranes in this configuration could provide up to a 20-fold life extension. The life extension could be further increased by using a more selective carbon dioxide removal method.

The configuration of FIG. 3 uses a combination of the previous designs. The carbon dioxide is removed by an electrochemical scrubber unit with a very high selectivity to carbon dioxide. Hence, the oxygen losses are negligible. The hybrid system also uses a small sweep stream that dilutes the oxygen-rich stream from the oxygen extraction unit to safe levels. Since the stream from the oxygen extraction unit contains 58.5% oxygen, it presents a fire and explosion hazard and dilution to lower oxygen levels is advantageous. The sweep unit also provides an excess flow to the shelter which can be used to maintain a positive flow out of the shelter as well as to decontaminate personnel entering the shelter and purge the airlock.

The shelter is maintained at a concentration of 22% oxygen by a feed flow of 200 Lpm, containing 30% oxygen. The exhaust stream flow rate of 182 Lpm is adequate for preventing leaks into the shelter and for decontaminating the airlocks. The oxygen extraction unit requires about 48 $m^2$ of membrane and consumes 5.5 hp in compression energy. In contrast, the sweep generation system is much smaller, requiring less than 3 $m^2$ of membrane area and about 1 hp of energy. The agent concentration in the stream from the membrane units is 20 times less than in the contaminated air and the net life extension of the carbon filter is 205. The system requires less membrane area and compression energy than either of the two other configurations, illustrating the advantage of a hybrid system that combines the best features of different technologies.

Configurations four and five both provide a high shelter flow rate and a slightly low oxygen concentration. However, the membrane area requirements are relatively small and the life extension of the filter is up to 100 times.

We claim:

1. A process for supplying breathable air to a personnel shelter, comprising:
   passing a stream of air containing a toxic agent across a permselective membrane having a feed side and a permeate side;
   withdrawing from said permeate side a permeate stream enriched in oxygen and depleted in toxic agent compared to said stream of air;
   passing said permeate stream into a sorbent unit containing a sorbent that can sorb said toxic agent;
   withdrawing from said sorbent unit an oxygen-enriched air supply stream;

passing said air supply stream to said personnel shelter.

2. The process of claim 1, further comprising:
withdrawing a second stream of air containing carbon dioxide from said personnel shelter;
removing at least a portion of said carbon dioxide from said secon stream of air;
returning said second stream of air to said personnel shelter.

3. The process of claim 2, wherein said removing is performed by passing said second stream of air containing carbon dioxide across a second permselective membrane that preferentially permeates carbon dioxide.

4. The process of claim 2, wherein said removing is performed by passing said second stream of air containing carbon dioxide through a unit containing a substance that preferentially sorbs carbon dioxide.

5. The process of claim 2, wherein said removing is performed by passing said second stream of air into an electrochemical cell that preferentially transports carbon dioxide.

6. The process of claim 1, further comprising:
passing a second stream of air containing a toxic agent across a second permselective membrane having a second feed side and a second permeate side;
withdrawing from said second feed side a residue stream enriched in nitrogen and depleted in toxic agent compared to said second stream of air;
passing said residue stream into said sorbent unit;
withdrawing from said sorbent unit an air supply stream comprising a mixture of said residue stream and said permeate stream;
passing said air supply stream to said personnel shelter.

7. The process of claim 1, wherein said permselective membrane is made from a polymer chosen from the group consisting of polysulfone, polyethersulfone, polyimide, polyetherimide, polyamide, polycarbonate, ethylcellulose, cellulose acetate, polyphenylene oxide, polymethylpentene, polyacetylene and substituted polyacetylene.

8. The process of claim 1, wherein said permselective membrane is made from polyethersulfone.

9. A life-support system, comprising:
a personnel shelter;
a membrane unit for removing a toxic agent from air and enriching the oxygen content of said air;
a sorbent unit for removing a toxic agent from air, said membrane unit, sorbent unit and personnel shelter being connected in series such that the product stream from said membrane unit flows through said sorbent unit and thence to said personnel shelter, so as to provide oxygen-enriched, detoxified air to said personnel shelter;
means for maintaining a carbon dioxide concentration within the atmosphere of said personnel shelter below 1%.

10. The life-support system of claim 9, wherein said sorbent unit is a unit containing activated carbon.

11. The life-support system of claim 9, wherein said means is a second membrane unit connected to said personnel shelter in such a way that an air stream can be withdrawn from said personnel shelter and passed through said second membrane unit and a carbon dioxide depleted stream from said second membrane unit can be returned to said personnel shelter.

12. The life-support system of claim 9, wherein said means is a unit containing a substance that preferentially sorbs carbon dioxide.

13. The life-support system of claim 9, wherein said means is an electrochemical cell that preferentially transports carbon dioxide.

14. The life-support system of claim 9, wherein said means comprises a second membrane unit for producing a nitrogen-enriched stream, said second membrane unit being connected in series with said sorbent unit and said personnel shelter, such that the product stream from said second membrane unit flows through said sorbent unit and thence to said personnel shelter, so as to provide a sweep flow of gas through said personnel shelter.

15. The life-support system of claim 9, further comprising a second membrane unit for producing a nitrogen-enriched stream, said second membrane unit being connected in series with said sorbent unit and said personnel shelter, such that the product stream from said second membrane unit flows through said sorbent unit and thence to said personnel shelter.

16. The life-support system of claim 9, wherein said membrane unit comprises a permselective membrane made from a polymer chosen from the group consisting of polysulfone, polyethersulfone, polyimide, polyetherimide, polyamide, polycarbonate, ethylcellulose, cellulose acetate, polyphenylene oxide, polymethylpentene, polyacetylene and substituted polyacetylene.

17. The life-support system of claim 9, wherein said membrane unit comprises a permselective membrane made from polyethersulfone.

18. An air supply system, comprising:
(a) a membrane unit for removing a toxic agent from an air stream and enriching the oxygen content of said air stream;
(b) sorbent unit for removing a toxic agent from an air stream, connected in series with said membrane unit, such that an air stream to be treated passes first through said membrane unit and then through said sorbent unit.

19. The air supply system of claim 18, wherein said membrane unit removes at least 90% of said toxic agent from said air stream.

* * * * *